United States Patent Office  3,111,514  Patented Nov. 19, 1963

3,111,514
AMINOALKYLBIGUANIDES
Jerry E. Robertson, Milwaukee, Wis., assignor to Lakeside Laboratories, Inc., Milwaukee, Wis., a corporation of Delaware
No Drawing. Filed Feb. 28, 1961, Ser. No. 92,181
6 Claims. (Cl. 260—239)

This invention relates to chemical compounds which have pharmacological or therapeutic activity and processes of preparing the same.

According to the present invention there are provided novel N,N-alkylene aminoalkylene biguanides of the formula

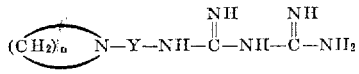

wherein $n$ is an integer from 6 to 7 and Y is a lower alkylene and advisably has from two to three carbons such as ethylene, propylene, 1,2-propylene and 2,3-propylene, and nontoxic pharmaceutically acceptable acid addition salts thereof.

The N,N-alkylene aminoalkylene biguanides of this invention can be produced by reacting an N,N-alkylene aminoalkylenehalide with ammonia to produce an N,N-alkylene aminoalkyleneamine and then reacting it with dicyanadiamide to form the N,N-alkylene aminoalkylene biguanide. This process can be represented as follows:

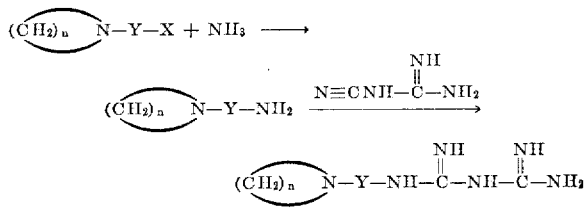

wherein X is a reactive halogen and is particularly chlorine or bromine and $n$ and Y have the assigned significance.

Some of the reactants which can be used in the first step are 2 - (octahydro - 1 - azocinyl) - ethylchloride, 3-(octahydro - 1 - azocinyl) - propylchloride, and 3 - (hexahydro - 1 - azepinyl) - propylchloride.

The amination step is readily effected by adding the N,N-alkylene aminoalkylenehalide, in the form of an acid addition salt such as the hydrochloride, to a suitable liquid organic reaction medium such as a lower alcohol and bringing the solution in contact with ammonia or ethanolic ammonia. Elevated temperatures and increased pressures promote the reaction. After the reaction is terminated the mixture can be made basic, the oily product extracted with ether and the extract distilled under reduced pressure to separate the product.

Some of the N,N-alkylene aminoalkyleneamines which are produced in this way are 2 - (octahydro - 1 - azocinyl) - ethylamine and 3 - (hexahydro - 1 - azepinyl)-propylamine.

In the second step of the process an N,N-alkylene aminoalkyleneamine is reacted, in the form of an acid addition salt, with dicyanadiamide. No solvent is required for the reaction. However, heating of the mixture at about 100° to 150° C. promotes the reaction. After the reaction is terminated the mixture is cooled to room temperature and the solidified product recrystallized as from isopropanol or ether. The product obtained from the reaction is in the form of an acid addition salt. The free base can be formed by treating the salt with an inorganic base such as sodium hydroxide or sodium carbonate.

Representative of the products that are produced in this way are 2 - (octahydro - 1 - azocinyl) - ethyl biguanide, 3 - (octahydro - 1 - azocinyl) - propyl biguanide, 2-(hexahydro - 1 - azepinyl) - ethyl biguanide and 3 - (hexahydro - 1 - azepinyl) - propyl biguanide.

These and similar products within the scope of this invention can be converted to nontoxic pharmaceutically acceptable acid addition salts such as the hydrochloride, hydrobromide, sulfate, formate, acetate, succinate and fumarate by known methods.

The N,N-alkylene aminoalkylene biguanides are potent blood pressure depressants. In addition to their use as blood-pressure reducing agents in the treatment of various hypertensive states, these compounds also possess utility as experimental tools in the pharmacological laboratory in the study of hypertension. In the treatment of hypertension, daily doses in the range of 5 to 200 mg. of one or more of the compounds, advisably as nontoxic acid addition salts, can be used with the particular dosage determined by the physician in light of the patient's condition. Suitable unit dosage forms such as tablets, capsules and solutions can be prepared as advisable. Such unit dosages can contain 1 to 200 mgm., and advisably 5 to 50 mgm., of one of the active biguanides of this invention. The oral route of administration is preferred.

The following examples illustrate the preparation of the compounds of this invention.

EXAMPLE 1

2-(Octahydro-1-Azocinyl)-Ethyl Amine 2-(octahydro-1-azocinyl)-ethyl chloride hydrochloride (106.1 g., 0.5 mole) was dissolved in 200 ml. of absolute ethanol and added to 1.8 liter of 10.3 M ethanolic ammonia. This mixture was heated in an autoclave for three hours at 125° C. and the solution was concentrated in vacuo. The resultant slurry was added to 500 ml. of 10% potassium hydroxide. An oil separated which was extracted into three 200 ml. portions of ether. The separated and combined ether extracts were dried over potassium carbonate, the ether removed under vacuum, and the residue distilled to afford 51.9 g. (66.5%) of product, B.P. 53–54° C./0.5 mm.

Analysis.—Calcd. for $C_9H_{20}N_2$: N, 17.93. Found: N, 17.91.

EXAMPLE 2

2-(Octahydro-1-Azocinyl)-Ethyl Biguanide Dihydrochloride

A solution of 15.6 g. (0.10 mole) of 2-(octahydro-1-azocinyl)-ethyl amine in 200 ml. of anhydrous ether was treated with an excess of ethereal HCl to give the crude dihydrochloride which was collected, washed with ether, and dried. This material was mixed with 8.4 g. (0.10 mole) of dicyanadiamide and heated with stirring at about 140° C. for 1.5 hours. On standing at room temperature the fusion mass solidified. The solid was recrystallized from 115 ml. of boiling isopropanol to give a gummy solid which was crystallized by decanting off the alcohol and triturating with dry ether to afford 16.5 g. (52.7%) of hygroscopic product.

Various changes and modifications of the invention can be made and, to the extent that such variations incorporate the spirit of this invention, they are intended to be included within the scope of the appended claims.

What is claimed is:

1. A member of the group consisting of compounds of the formula

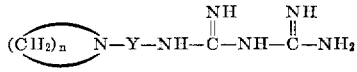

and nontoxic pharmaceutically acceptable acid addition salts thereof, wherein $n$ is an integer from 6 to 7 and Y is lower alkylene.

2. Compounds according to claim 1 in which Y is ethylene.

3. Compounds according to claim 1 in which Y is propylene.

4. 2-(octahydro-1-azocinyl)-ethyl biguanide.

5. 2-(octahydro-1-azocinyl)-ethyl biguanide hydrochloride.

6. 3-(octahydro-1-azocinyl)-propyl biguanide.

References Cited in the file of this patent

UNITED STATES PATENTS

| | | |
|---|---|---|
| 2,623,880 | Hopff et al. | Dec. 30, 1952 |
| 2,748,113 | Blicke | May 29, 1956 |
| 2,928,829 | Mull | Mar. 15, 1960 |

FOREIGN PATENTS

| | | |
|---|---|---|
| 190,940 | Austria | July 25, 1957 |
| 225,274 | Austria | Nov. 6, 1959 |
| 631,878 | Great Britain | Nov. 11, 1949 |

OTHER REFERENCES

Degering: Organic Nitrogen Compounds, pages 464–471 (1945).

Blicke et al.: Jour. Amer. Chem. Soc., volume 76, pages 2422–26 (1954)

Welvart: Bull. Soc. Chim., France, 1955, pages 218–19.

Mull et al.: Jour. Amer. Chem. Soc., volume 80, pages 3769–72 (1958).

Chemical Abstracts, volume 52, page 18899 (1958).

UNITED STATES PATENT OFFICE
CERTIFICATE OF CORRECTION

Patent No. 3,111,514            November 19, 1963

Jerry E. Robertson

It is hereby certified that error appears in the above numbered patent requiring correction and that the said Letters Patent should read as corrected below.

Column 4, line 3, for "225,274 Austria -------Nov. 6, 1959" read -- 225,274 Australia-------Nov. 6, 1959 --.

Signed and sealed this 28th day of April 1964.

(SEAL)
Attest:

ERNEST W. SWIDER
Attesting Officer

EDWARD J. BRENNER
Commissioner of Patents